Oct. 22, 1929.   F. C. WILSON   1,732,627
CLOTHESLINE PROP CLUTCH
Filed Sept. 25, 1928
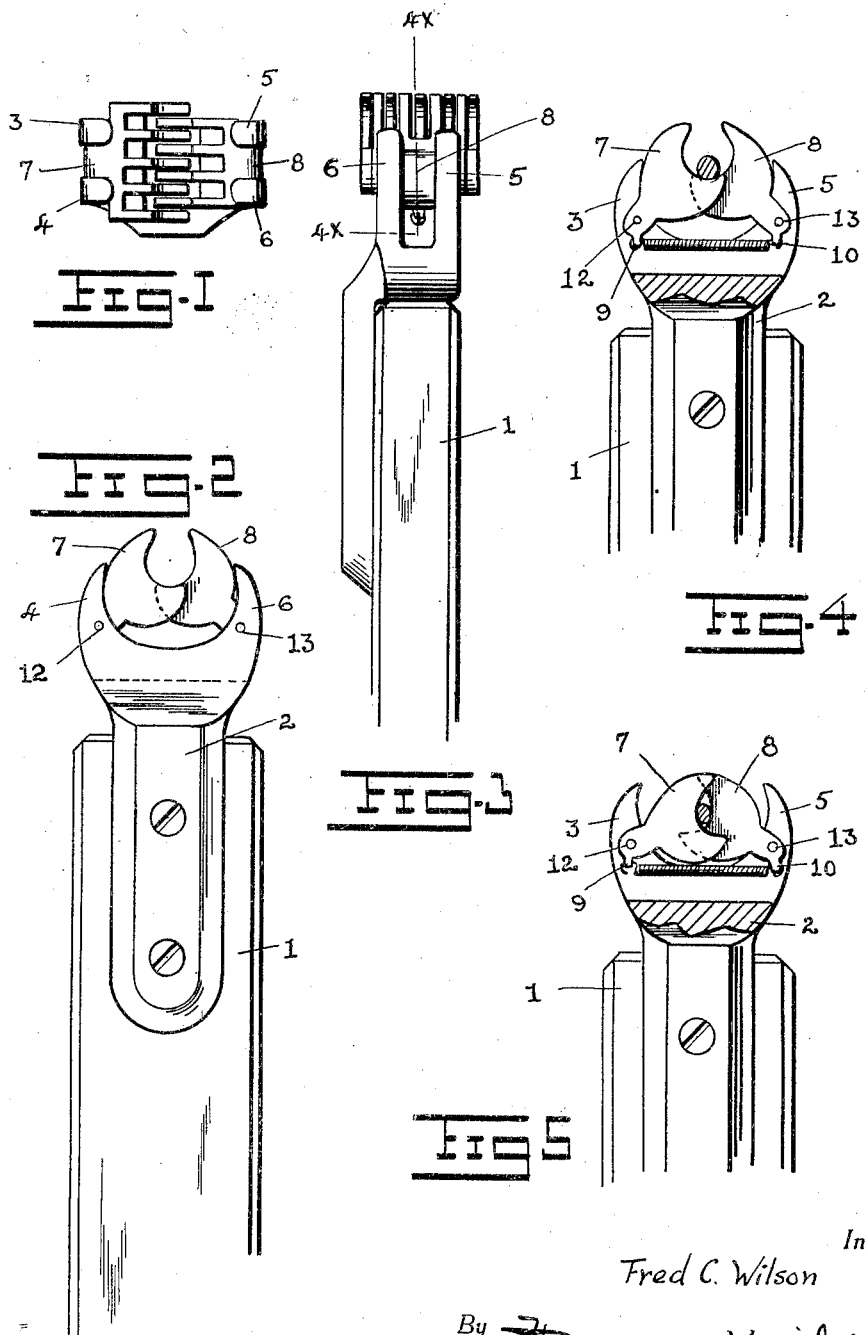
Inventor
Fred C. Wilson
By Frank Kiefer
Attorney Patented Oct. 22, 1929

1,732,627

UNITED STATES PATENT OFFICE

FRED C. WILSON, OF ROCHESTER, NEW YORK

CLOTHESLINE-PROP CLUTCH

Application filed September 25, 1928. Serial No. 308,284.

The object of this invention is to provide a new and improved form of clutch to be used on a prop for a clothes line.

Another object of the invention is to make the clutch close on the line automatically by the weight of the line.

Another object is to form a clutch for the line that is provided with two jaws each of which is provided with teeth that are suitably spaced apart with recesses between them, the teeth of one jaw being adapted to partially nest in the recesses of the other jaw when the clutch is open or closed.

These and other objects of the invention will be illustrated in the drawings, described in the specification and pointed out in the claims at the end thereof.

In the drawings:

Figure 1 is a top plan view of the clutch.

Figure 2 is a front elevation of the clutch.

Figure 3 is a side elevation of the clutch.

Figure 4 is a sectional elevation on the line $4^x, 4^x$ of Figure 3 showing the clutch open.

Figure 5 is a sectional elevation on the same line showing the clutch closed.

In the drawings like reference numerals indicate like parts.

In the drawings reference numeral 1 indicates the clothes prop and 2 indicates the stationary frame of the clutch made as a single piece either as a casting or of sheet metal. This frame is provided with the forked arms 3, 4, 5 and 6. These arms are arranged in pairs, each pair of arms forming a fork. Between each pair of forked arms is pivoted one of the jaws 7 and 8. The jaws are pivoted on the pins 12 and 13, which are carried in the stationary forks. Each of these jaws is provided with a lug 9 and 10 which lugs are connected by the tension spring 11 which spring normally draws the lugs toward each other and hold the jaws apart in the position shown in Figure 2. Each of the jaws has a plurality of teeth thereon which teeth are separated or spaced apart by recesses. The teeth of one jaw are adapted to nest in the spaces of the other jaws. The teeth of the jaws when the jaws are open overlap each other at the bottom to the extent shown in Figure 4 forming a groove that is open at the top and is adapted to receive a clothesline.

The jaws normally stand in the position shown in Fig. 4, that is, spread apart to receive the clothesline. When the jaws are put up against the line the weight of the line with the clothes thereon will draw the jaws down to the position shown in Figure 5 with the jaws closed so that the teeth thereof overlap each other at the bottom and top, in which position they firmly clutch the line and prevent the clutch from sliding on the line. This holds the clothes prop in place on the line so that the wind and the thrashing of the clothes will not disturb the position of the clothes prop but the clothes prop will remain securely held in place holding the line up from the ground.

I claim:

1. A frame having four arms on the end thereof arranged in pairs forming two forks, a jaw swinging in each fork, each of said jaws having a lug on one end thereof by which it is pivoted in its fork, each jaw on the other end having a plurality of teeth with spaces between the teeth, the teeth of one jaw being adapted to partially nest in the spaces of the other jaw, a spring connected to the lower ends of the lugs below the pivot adapted to hold the jaws open, the teeth of said jaws when open forming a groove displaced laterally from the pivots of the jaws and adapted to receive a clothesline therein, the jaws being adapted to be closed on the line by the weight of the line and by their shape causing the clutch to grip the line.

2. A frame having four arms on the end thereof arranged in pairs forming two forks, a jaw swinging in each fork, each of said jaws having a lug on one end thereof by which it is pivoted in its fork, each jaw on the other end having a plurality of teeth with spaces between the teeth, the teeth of one jaw being adapted to partially nest in the spaces of the other jaw, a spring connected to the lower ends of the lugs below the pivot adapted to hold the jaws open, the teeth of said jaws when open forming a groove adapted to receive a clothesline.

3. A clutch having two jaws pivoted thereon each jaw having teeth thereon spaced apart with recesses between them, the teeth on one jaw being adapted to partially nest in the spaces of the other jaw, means for normally maintaining the jaws open with the teeth of each jaw overlapping the teeth of the other jaw at the bottom and forming a rounded groove between the jaws that is closed at the bottom and open at the top, said groove being adapted to receive a clothesline.

4. A clutch having two jaws pivoted thereon each jaw having teeth thereon spaced apart with recesses between them, the teeth on one jaw being adapted to partially nest in the spaces of the other jaw, means for normally maintaining the jaws open with the teeth of each jaw overlapping the teeth of the other jaw at the bottom and forming a rounded groove between the jaws that is closed at the bottom and open at the top, said groove being adapted to receive a clothesline, the jaws having parallel pivots and being adapted to be swung toward each other by the weight of the line causing the jaws to grip the line between them.

In testimony whereof I affix my signature.

FRED C. WILSON.